Aug. 7, 1945.   H. A. STRICKLAND, JR   2,381,373
SYNCHRONOUS MOTOR GENERATOR CONNECTION
Filed June 12, 1942
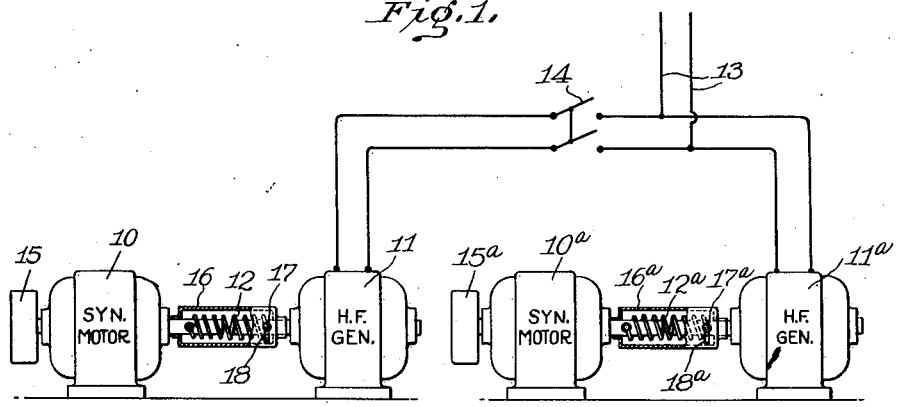
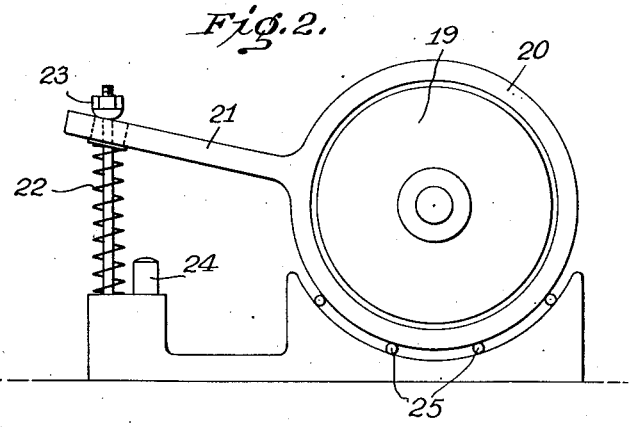
INVENTOR
Harold A. Strickland Jr.
BY
ATTORNEY Patented Aug. 7, 1945

2,381,373

UNITED STATES PATENT OFFICE 2,381,373

SYNCHRONOUS MOTOR GENERATOR CONNECTION

Harold A. Strickland, Jr., Detroit, Mich., assignor to Budd Wheel Company, Philadelphia, Pa., a corporation of Pennsylvania Application June 12, 1942, Serial No. 446,693

7 Claims. (Cl. 171—119)

This invention relates to motor generators and particularly to couplings between high frequency generators and synchronous motors.

In a generator construction, especially in the case of high frequency generators, it is almost impossible to secure identity of placement and relationship of parts so as to secure exactly parallel electric characteristics and performance. Further when two generators, for example, are each rigidly connnected to separate motors the angularly space relationship of the generator stator with reference to the corresponding rotor of the motor may differ. The result of this structural diversity becomes particularly apparent when two or more generators, each driven by a synchronous motor are connected in parallel to support a common electrical load. In such cases although driven at identical speeds the voltage phase angles will differ and hence one generator may take most or all of the load and as the load builds up, may become overloaded, this condition being accompanied by a circulating power factor, the load of one generator transferring energy into the other generators.

One suggestion for overcoming the mentioned difficulties is to adjust angularly the pole elements or laminations of the generators so as to secure identical phase conditions in output. It is apparent that in the case of multi-pole high frequency generators, this procedure would be difficult and generally unsatisfactory. It is one of the objects therefore of the present invention to provide means for prevention of overload in one of several generators or alternators connected in parallel prior to assumption of full load by the other generators.

Another object is to provide simple, yieldable means independent of the electrical pole pieces, laminations or windings of the generator for securing automatic adjustment of lag with reference to the driving motor.

Still another object is the provision of drive connections between generator and motor effective only at predetermined load to bring about lag variations between generator and motor.

In agreement with these objects, I have disclosed herein below certain forms of my invention which may be preferred. These forms are illustrated in the accompanying drawing in which.

Figure 1 shows a diagrammatic representation of one embodiment of this invention;

Figure 2 shows a diagrammatic modified construction.

Two synchronous motor generator sets are illustrated as being adapted for parallel operation of the generators. A synchronous motor 10 drives the high frequency generator 11 through a connection in which is a preloaded spring 12. The other motor generator set is similar, consisting of the motor 10a, generator 11a, and preloaded spring 12a. The generator 11 is adapted to be connected for parallel operation with the generator 11a through the switch 14 so that both generators may supply the line 13. If desired a fly wheel 15 or other well-known means to reduce any tendency for hunting by the synchronous motor may be provided. Specifically the preloaded spring connection includes a sleeve 16 which is splined or keyed to the shaft of the motor 10, is provided with a slot 18 in which is located a pin 17 that is secured to the generator shaft. The spring 12 at its left end is fastened to the motor shaft and therefore is fixed with respect to the sleeve 16. At its right end the spring 12 is fastened to the pin 17, which in turn is secured to the generator shaft.

Each motor generator set is shown as being provided with such a spring connection. Each synchronous motor is adapted for operation on ordinary line frequency. The high frequency generator is constructed to deliver current at frequencies many times that of the motor. One use to which such generators may be used is in electromagnetic inductive heating. With a 60 cycle motor frequency and a generator frequency of 3000 cycles, a phase displacement in the waves of the two generators before being connected will be substantially $\frac{1}{50}$ as great as in one of the synchronous motors. Pulling one generator into phase with the other causes the angular displacement referred to in at least one motor. The spring 12 is preloaded to some desired amount which is preferably at least a substantial or major portion of the full load capacity of each generator. With small loads of course only one generator is needed. With larger loads than the rated capacity of one generator, two may be used. If the generator load were variable and the springs 12 and 12a were each preloaded an amount equal to the full load capacity of its generator and if the line load were increased up to just below the combined capacities of both generators, then when the waves of the two generators were not exactly in phase before being connected in multiple, the operation would be approximately as follows: As the load increases, one generator might take substantially all the load up to the amount to which its spring was initially loaded, depending of course, on the value of their initial phase displacement. Above this value its spring would allow angular displacement between the motor and generator shafts permitting the other generator to assume an increase in load. In other words, the preloaded spring connection functions as a rigid coupling with loads below that initially placed on the spring.

If two motor generator sets could be tested and it could be discovered which generator first took most of the load, then the resilient connection could be dispensed with for one or the other generator, but not on both. However, where such tests are not practicable, it will be found advantageous to use the preloaded spring connection on each motor generator set. The spring is preferably one having a comparatively flat torque characteristic, that is, one in which relatively small deflections occur with fairly wide load changes. In the case of springs having a steep force-deflection characteristic or readily flexible springs operating at half-load or lower, the results are in general unsatisfactory. The spring is also one which preferably has a natural period of vibration different from one which might cause the motor to hunt. Without an initial load on the spring because of its flexibility there probably would be an excessive tendency for the synchronous motors to hunt. In event of any tendency to hunting when the motor is loaded above or below that initially placed on the spring, fly wheel 15 will be found to aid in reducing such hunting tendency. Of course, where some squirrel cage type of inductive winding is placed on the stator for the purposes of starting the synchronous motor when it is of a polyphase type, such windings will also aid in the reduction of any hunting tendency as is well known in the art.

In Fig. 2 the rotor 19 of the generator is driven by a synchronous motor as in Fig. 1 and the stator 20 is mounted on rollers 25 so as to be angularly adjustable. The torque arm 21 is fixed to the stator frame and engages the spring 22, which is preloaded to the desired amount by means of a threaded stem carrying an adjustable nut 23. A fixed abutment 24 limits the amount of permissible angular displacement. The purpose of the spring 22 is the same as it is for the spring 12 in Fig. 1 but this preloaded spring 22 has the advantage that it is non-rotatable. A leaf spring might be used in Fig. 2 instead of the helical spring. The arm 21 is slotted for the stem.

Though only a single form of the invention is illustrated and described the invention is not limited thereto but may be embodied in various forms as desired. As various changes in construction and arrangement of parts may be made without departing from the spirit of the invention as will be apparent to those skilled in the art, reference will be had to the appended claims for a definition of the limits of the invention.

What is claimed is:

1. In a combination including a pair of synchronous generators, a motor driving each generator at the same speed as the other generator, means for connecting said generators in parallel, and means to limit the load assumed by one generator and its motor in excess of the load on the other generator and motor when it is not in exact synchronism before being connected, said excess load limiting means including a spring in a driving connection between at least one of the generators and its motor, said spring being preloaded to the full load value of the generator to which it is connected.

2. The combination with an alternating current generator and synchronous motor driving the same, of a spring in a connection between the generator and motor, said spring being pre-loaded to a value corresponding to generator full load, whereby relative angular displacement between the rotor of the generator and its driving motor takes place only after the generator has reached full load value.

3. In a combination including a pair of alternating current generators, a motor driving each generator at the same speed as the other generator, means for connecting said generators in parallel, and means to limit the load assumed by one generator and its motor in excess of the load on the other generators and motor when it is not in exact synchronism before being connected, said excess load limiting means including a spring in a driving connection between at least one of the generators and its motor, and said spring being pre-loaded to a point corresponding to full load value of the generator to which it is connected.

4. In combination, an alternating current generator, a synchronous motor for driving the generator, and a yieldable self-restoring device mechanically connected to said generator, said device being subject to stress from said motor but being pre-loaded to a value corresponding to generator full load, whereby angular re-adjustment of the generator elements takes place only after the generator has reached full load value.

5. The combination according to claim 4 with the pre-loaded device comprising a spring having a natural vibrating period differing substantially from the normal synchronous period of the motor, whereby hunting is avoided.

6. The combination of claim 4 with the additional limitation of the device to a flat torque spring which also possesses a free period of vibration substantially different from that of synchronous period of said motor.

7. In combination an alternating current generator having an angularly adjustable stator frame and fixed support, a synchronous motor for driving said generator and a yieldable and self-restoring connection between said generator stator and support, said connection being pre-loaded to full generator load value.

HAROLD A. STRICKLAND, Jr.